US008224707B1

(12) United States Patent
Smith et al.

(10) Patent No.: US 8,224,707 B1
(45) Date of Patent: Jul. 17, 2012

(54) SOCIAL NETWORK FOR SHOPPING

(75) Inventors: Arthur Quentin Smith, Fredericksburg, TX (US); Bharat Prasad, San Antonio, TX (US); Bradly Jay Billman, San Antonio, TX (US); Charles L. Oakes, III, Boerne, TX (US); Reynaldo Medina, III, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 330 days.

(21) Appl. No.: 12/195,148

(22) Filed: Aug. 20, 2008

(51) Int. Cl.
*G06Q 30/00* (2006.01)
(52) U.S. Cl. ...................................... 705/26.1
(58) Field of Classification Search .............. 705/26, 705/27, 26.1, 26.35, 27.1
See application file for complete search history.

(56) References Cited

U.S. PATENT DOCUMENTS

| | | | |
|---|---|---|---|
| 6,360,209 | B1 | 3/2002 | Loeb et al. |
| 7,251,621 | B1 * | 7/2007 | Weng ............................. 705/26 |
| 2001/0025271 | A1 | 9/2001 | Allen |
| 2002/0035515 | A1 | 3/2002 | Moreno |
| 2002/0128949 | A1 | 9/2002 | Wiesehuegel et al. |
| 2003/0004831 | A1 | 1/2003 | Owens |
| 2003/0023537 | A1 * | 1/2003 | Joshi et al. ...................... 705/37 |
| 2003/0132298 | A1 | 7/2003 | Swartz et al. |
| 2003/0177072 | A1 | 9/2003 | Bared |
| 2004/0064376 | A1 * | 4/2004 | Yoshida .......................... 705/26 |
| 2005/0192958 | A1 * | 9/2005 | Widjojo et al. .................. 707/5 |
| 2008/0065514 | A1 * | 3/2008 | Eaton .............................. 705/27 |

OTHER PUBLICATIONS http://Craigslist.org; Dates Printed: Dec. 2, 2004; Feb. 4, 2005; Feb. 8, 2007; Mar. 5, 2007.*
www.craigslist.org [online] as archived on Dec. 10, 2004; Feb. 19, 2005; Jul. 20, 2005; Jul. 23, 2005; Aug. 9, 2005; May 13, 2006; and Mar. 5, 2007 by www.archive.org [retrieved on Jul. 6, 2009 and Jul. 7, 2009].*
Ken Partch, "Home delivery? It's the economics, stupid," Supermarket Business, Jul. 1998, vol. 53, Iss. 7, p. 122.*
Randalls-Ebooks: "10 Easy and Fun Ways to Make Money with Your Pickup", eBay Guides, Jun. 24, 2008, pp. 1-3.
http://craigslist.org; Dates Printed: Dec. 10, 2004; Feb. 4, 2005; Feb. 8, 2007; and Mar. 5, 2007.
http://www.ontherunerrands.com; On The Run Errands, Inc.; Date Printed: Jul. 4, 2007.
http://www.craigslist.org; Craigslist; Date Printed: Jul. 21, 2005.
http://www.craigslist.org; Craigslist; Date Printed: May 12, 2006.
http://www.ontherunerrands.com; On The Run Errands, Inc.; Date Printed: Jul. 5, 2007.

* cited by examiner

*Primary Examiner* — Jeffrey A Smith
*Assistant Examiner* — Brandy A Zukanovich
(74) *Attorney, Agent, or Firm* — Brooks, Cameron & Huebsch PLLC.

(57) ABSTRACT

A social network for shopping may be provided in which a user may provide a listing of an item they would like and the identity of a seller the item may be retrieved from. Another user may agree to pick up the item from the seller and deliver the item, perhaps for a small fee. The listing of the item may be posted on a website, sent to other users by a web feed such as RSS, sent by a text message, instant message, email, or communicated in any other manner to one or more users, etc. Alternatively, a user may post the identity of a seller that they are going to and ask if any users would like any items picked up from the seller and delivered to them, perhaps for a small fee.

21 Claims, 7 Drawing Sheets

SOCIAL NETWORK FOR SHOPPING

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/195,160, and U.S. patent application Ser. No. 12/195,174, each filed on Aug. 20, 2008 and each entitled "Social Network For Shopping."

BACKGROUND

Shopping is the examining of goods or services from sellers with intent to purchase at that time. To many, shopping is considered an enjoyable or recreational activity.

To some, however, shopping is a task of inconvenience and takes up time that they would rather spend doing something else. Shoppers sometimes go though great lengths to wait in long lines to buy popular products. In addition to spending time making the purchase at the seller, time must be spent traveling to the seller.

SUMMARY

A social network for shopping may be provided in which a user may provide a listing of an item they would like and the identity of a seller the item may be retrieved from. Another user may agree to pick up the item from the seller and deliver the item, perhaps for a small fee.

In an implementation, the listing of the item may be posted on a website, sent to other users by a web feed such as RSS, sent by a text message, instant message, email, or communicated in any other manner to one or more users, etc.

In an implementation, a user may post the identity of a seller that they are going to and may ask if any users would like any items picked up from the seller and delivered to them, perhaps for a small fee.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
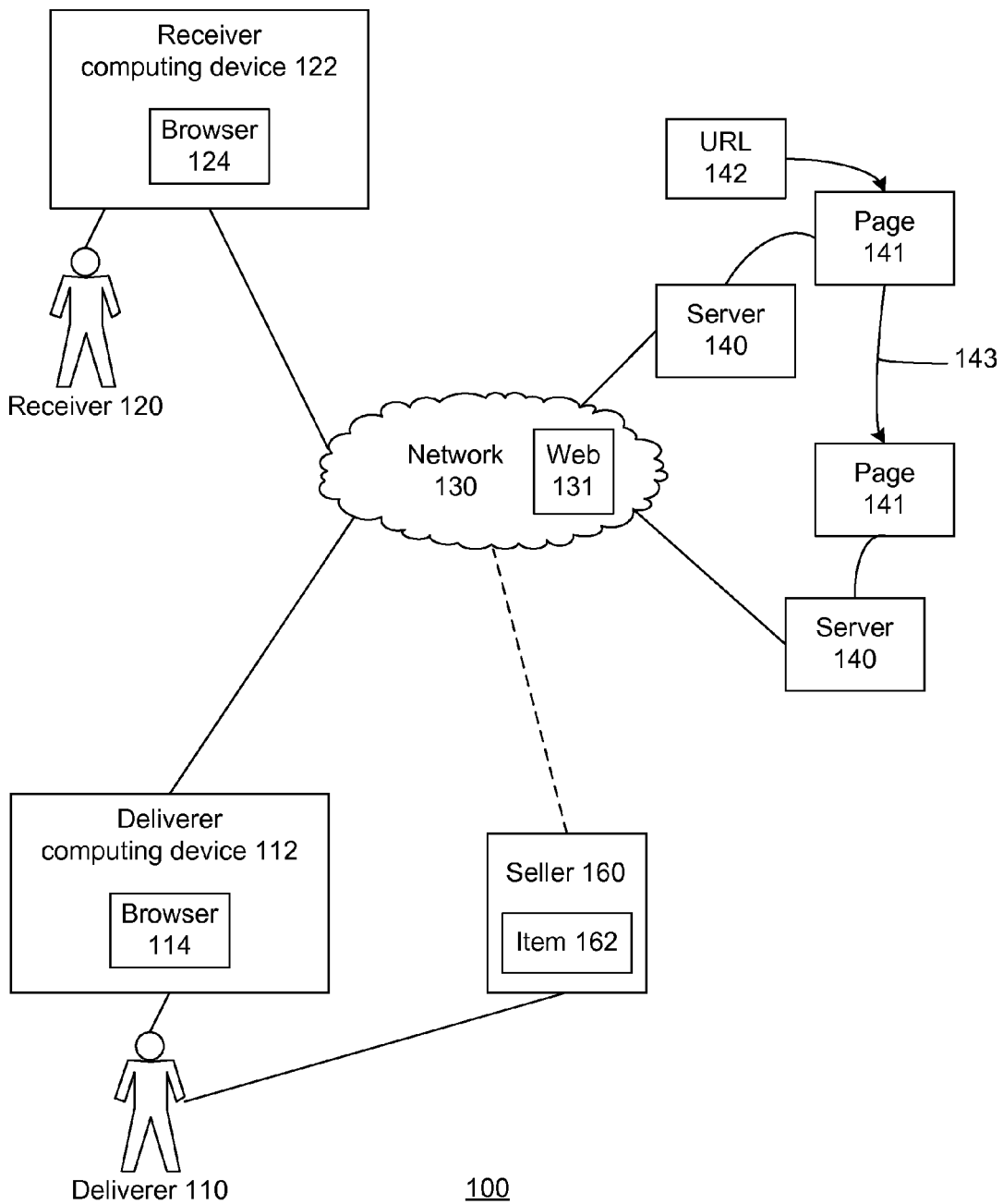
FIG. 1 shows an example of a computing environment in which aspects and embodiments may be potentially exploited.

FIG. 1 shows an example of a computing environment 100 in which aspects and embodiments may be potentially exploited. The environment 100 includes a deliverer computing device 112, a receiver computing device 122, and one or more server computers 140 ("servers") connected to each other by a network 130 such as, for example, the Internet, a wide area network (WAN), a local area network (LAN), an intranet, a public switched telephone network (PSTN), a cellular network, a voice over Internet protocol (VoIP) network, and the like. The deliverer computing device 112 and the receiver computing device 122 may be considered client computers ("clients") and each may have an associated user, e.g., deliverer 110 and receiver 120, respectively. Although two clients and two servers are shown in the environment 100, any number of clients and servers may be provided in the environment 100.

Any computing device may be used as the deliverer computing device 112 or the receiver computing device 122, such as a personal computer (PC), a handheld computing device, a cellular telephone, or a personal digital assistant (PDA). In an implementation, the deliverer computing device 112 and/or the receiver computing device 122 may be wireless, handheld, and may include a geographic positioner such as a GPS receiver which can be location-pinpointed using known techniques. Cellular positioning technology may also be used for geographic positioning. The deliverer computing device 112 and/or the receiver computing device 122 may include a cellular telephone capable of receiving and displaying non-voice data and which may be location-pinpointed using known techniques. An example computing device, such as the deliverer computing device 112 or the receiver computing device 122, and its components are described in more detail with respect to FIG. 7.

The network 130 provides access to services such as the World Wide Web (the "web") 131. The web 131 allows the client computer(s), such as the deliverer computing device 112 and the receiver computing device 122, to access documents containing text-based or multimedia content contained in, e.g., pages 141 (e.g., web pages or other documents) maintained and served by the server computer(s) 140. Typically, this is done with a web browser application program (referred to herein as a "web browser" or "browser") executing in the client computer(s), such as browser 114 and browser 124 executing in the deliverer computing device 112 and the receiver computing device 122, respectively.

The location of each page 141 may be indicated by an associated uniform resource locator (URL) 142 that is entered into the web browser application program to access the page 141. Many of the pages may include hyperlinks 143 to other pages 141. The hyperlinks may also be in the form of URLs. Content accessed by the client(s) may also be dynamically generated, e.g., from a database maintained and served by the server(s) 140.

A seller 160 is provided and may be any type of vendor or merchant of any type of good or service, referred to herein as an item. For example, the seller 160 may be a retail store such as a bookstore, a candy shop, a gift shop, a hardware store, a hobby store, a pet store, a pharmacy, a supermarket, etc. Additional examples of the seller 160 may be a big-box store, a convenience store, a department store, a general store, a dollar store, or any other type of store that sells a wider variety of products. In an implementation, the seller 160 may be connected to the deliverer computing device 112, the receiver computing device 122, and/or the server(s) 140 by the network 130. The deliverer 110, the receiver 120, and the seller 160 may also communicate with each other by phone, email, instant messaging, text messaging, facsimile, mail, and the like. Although one seller is shown in the environment 100, any number of sellers may be provided in the environment 100.

The receiver 120 may be an individual or an entity that provides a listing of an item 162 that they would like to be picked up from a seller, such as the seller 160, and delivered to them or another party. The listing of the item 162 may be posted on a website, sent to clients by a web feed such as RSS, sent by a text message, instant message, email, or communicated in any other manner to one or more clients, etc. The deliverer 110 may be an individual or an entity that may pick up the item 162 from the seller 160 and deliver the item 162 to the receiver 120 or a party specified by the receiver 120.

A social network is a social structure made of nodes (which are generally individuals or organizations) that are tied by one or more specific types of interdependency, such as values, visions, ideas, financial exchange, friendship, kinship, dislike, conflict, or trade, for example. In an implementation, a social network for shopping may comprise one or more websites that provide a virtual community in which people with a shared interest in shopping may communicate. As described further herein, in an implementation, the environment 100 may host a social network for shopping in which a user, such as the receiver 120, may post a listing of an item they would like and the identity (e.g., name, location, etc.) of a seller 160 the item may be retrieved from. Another user, such as the deliverer 110, may agree to pick up the item from the seller 160 and deliver the item to the receiver 120, perhaps for a small fee, thereby saving the receiver 120 from making a trip to the seller 160.

In another implementation, a user, such as the deliverer 110, may post the identity of the seller that they are going to and ask if any users, such as the receiver 120, would like any items picked up and delivered to them, perhaps for a small fee. Thus, the receiver 120 may save time and/or transportation costs by having the deliverer 110 go to the seller 160 for them to pick up and deliver an item, such as the item 162, that the receiver 120 would like to obtain (e.g., by purchase) from the seller 160.

Figure 2:
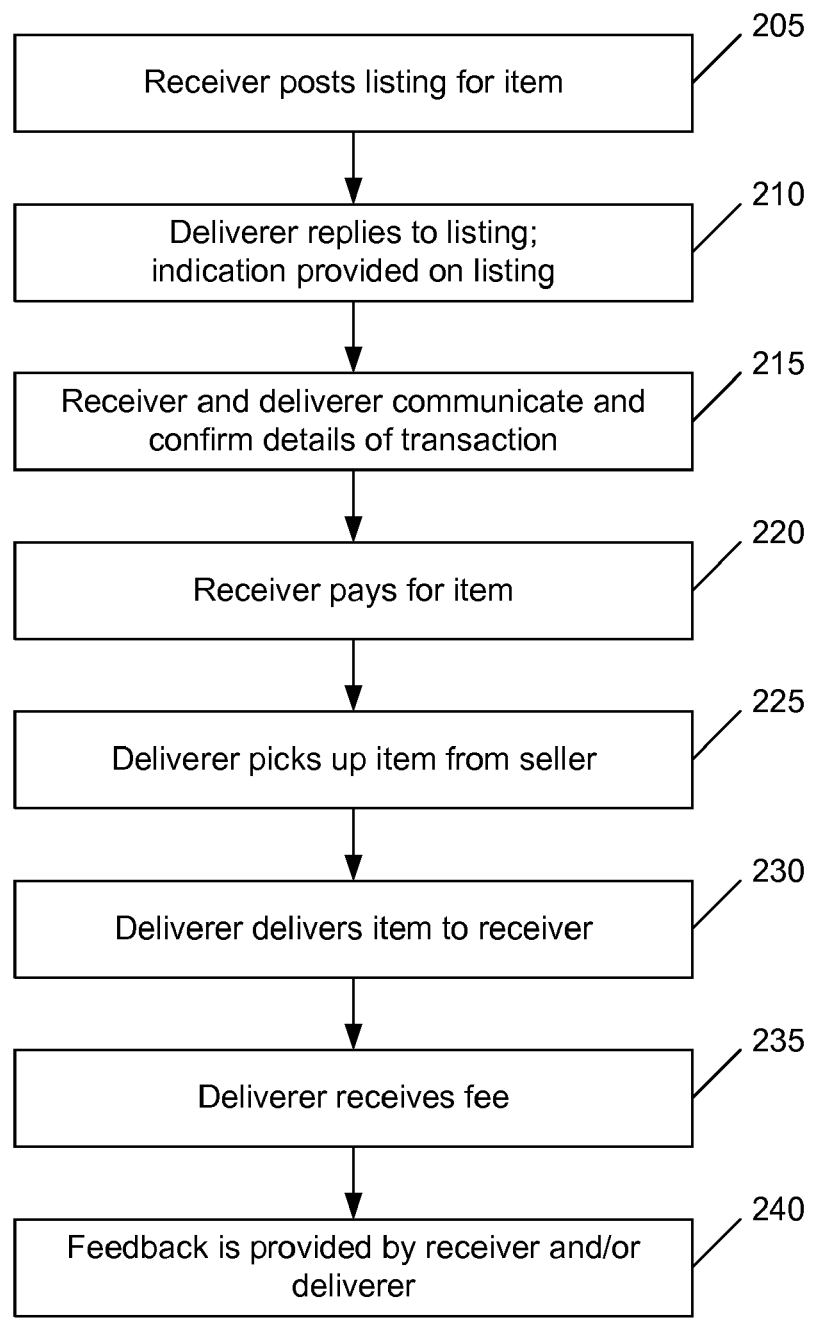
FIG. 2 is an operational flow of an implementation of a method that may be used with a social network for shopping.

FIG. 2 is an operational flow of an implementation of a method 200 that may be used with a social network for shopping. At 205, a user, such as the receiver, may post a listing for an item. The listing may be posted on a website associated with a social network for shopping, for example. Alternatively or additionally, the listing may be sent to one or more users by email, text message, instant message, RSS feed, etc., who may have indicated an interest in receiving such listings, e.g., by subscribing via a website associated with the social network to receive such listings.

The listing may provide information about an item that the receiver would like another user to pick up and deliver to the receiver or another party specified by the receiver. The receiver may provide information about where the item may be picked up (e.g., an identity and location of the seller) and where the item may be delivered to (e.g., location criteria), how much the receiver would pay for the item and a fee the receiver would pay another user (e.g., a deliverer) to pick up and deliver the item (e.g., price criteria), when the receiver would like the item picked up and delivered by (e.g., time criteria), etc. The receiver may also provide information regarding payment for the item, such as whether the receiver will prepay the user who picks up and delivers the item, whether the receiver will prepay the seller for the item, or whether the user who picks up and delivers the item is to purchase the item and the receiver will reimburse the purchase price to them, for example.

At 210, another user, referred to as the deliverer, may view the listing and reply to the listing. A reply may be provided via a website associated with the social network for shopping, for example, such as the website that the receiver posted the listing on. Alternatively or additionally, a reply may be sent from the deliverer to the receiver by email, text message, instant message, phone, facsimile, etc. The deliverer may tentatively agree to pick up the item and deliver the item to the receiver. The reply may contain information pertaining to the purchase, payment, pick up and/or delivery of the item.

In an implementation, an indication may be provided on the listing after the deliverer has tentatively agreed to pick up and deliver the item. For example, the listing may be shaded, highlighted, grayed out, etc. to indicate that the listing has been replied to and a transaction is tentatively in progress. In this manner, other users who may view the listing may be aware that another user has already offered to pick up and deliver the item to the receiver. The listing may not be removed until the item has been delivered to the receiver or the transaction has otherwise been completed.

At 215, the receiver and the deliverer may be put into communication with each other and may confirm details of the transaction. The receiver and the deliverer may communicate via a website, email, phone, text message, instant message, facsimile etc. to arrange for pick up and delivery of the item. Details of the transaction that may be confirmed may include the item (e.g., model number, size, color, etc.), the price, how payment is to be made, fee for pick up and delivery, seller name and location, timing of the pick up and delivery, etc. In an implementation, authentication may be performed with respect to the identities of the receiver and the deliverer and may be used to ensure that the receiver and deliverer are able to properly and securely identify each other during the transaction. Any known authentication techniques may be used. For example, a secret code may be assigned to the listing. The receiver and the deliverer may both receive the code and may subsequently compare codes to confirm identities.

At 220, the receiver may pay for the item. In an implementation, the receiver may pay the seller for the item prior to the pick up and delivery of the item. For example, the receiver may pay the seller for the item via a website associated with the seller prior to the deliverer picking up the item. Alternatively, the receiver may pay the seller for the item in person at the store, via telephone or facsimile, via mail, or via email, for example. After paying the seller for the item, the receiver may receive a confirmation code, transaction number, receipt, or other information that the receiver may provide to the deliverer that may provide proof of payment for the item and allow the deliverer to pick up the item from the seller.

Alternatively, the receiver may pay the deliverer for the item, either before or after the deliverer has picked up and/or delivered the item. In such a case, the deliverer may pay the seller for the item, e.g. when picking up the item from the seller. The receiver may pay the deliverer using any known payment method.

At 225, the deliverer may go to the seller of the item and pick up the item. If the receiver had previously paid the seller for the item, the deliverer may provide identification or other information to the seller regarding the purchase and/or authorization to pick up the item on the receiver's behalf. If the receiver had not previously paid the seller for the item, the deliverer may pay the seller for the item.

At 230, the deliverer may deliver the item to the receiver or a party specified by the receiver at an agreed upon location, such as the receiver's house or other location where the receiver or specified party may take possession of the item. At 235, the deliverer may receive a fee for picking up and delivering the item to the deliverer. The fee may be paid by the receiver to the deliverer either before or after pick up and/or delivery, and may be a fee that has been agreed upon by the receiver and the deliverer. The payment of the fee from the receiver to the deliverer may be made using any known payment method. In an implementation, the deliverer may not receive a fee by choice. The deliverer may wish to pick up and deliver the item without receiving a fee.

At 240, feedback concerning the pick up and delivery transaction may be provided by the receiver and/or the deliverer. Feedback regarding the deliverer may be provided by the receiver and feedback regarding the receiver may be provided by the deliverer. The feedback may be provided to a website associated with the social network for shopping, and may be available to the receiver, the deliverer, and other users of the social network. The feedback may be used for rating and/or ranking of the receiver and the deliverer.

Figure 3:
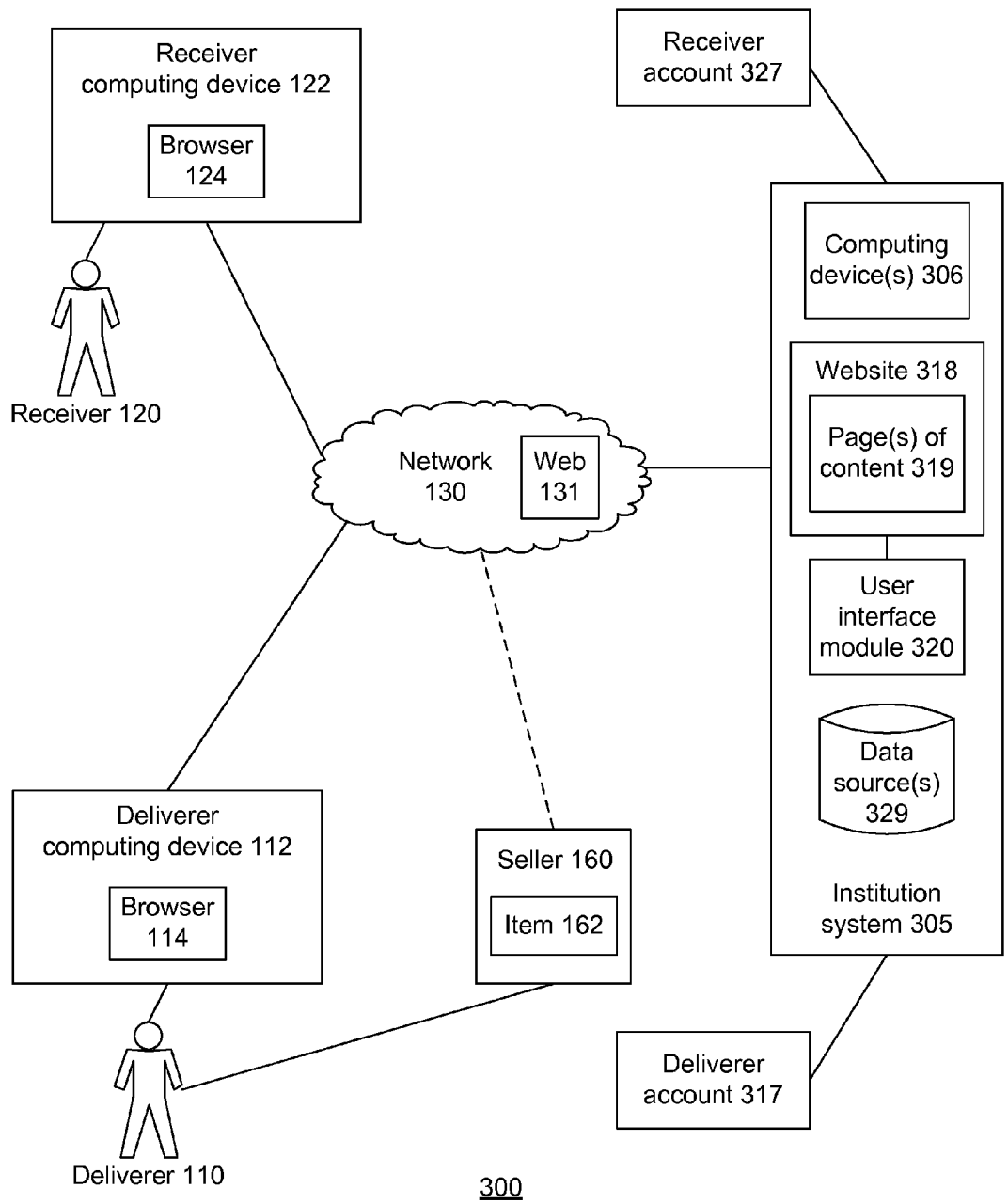
FIG. 3 is a block diagram of an implementation of a system that may be used to provide a social network for shopping.

FIG. 3 is a block diagram of an implementation of a system 300 that may be used to provide a social network for shopping. The implementation shown in FIG. 3 is similar to that shown FIG. 1 and may have elements or components that are similar. These similar elements or components are labeled identically and their descriptions are omitted for brevity.

The system 300 may include an institution system 305 which may be associated with any type of entity capable of maintaining accounts and providing funds to and from accounts. For example, the institution system 305 may be associated with a financial services institution such as a retail bank, an investment bank, an investment company, etc. Each account may be any type of account for depositing and/or providing funds, such as a savings account, a checking account, a brokerage account, and the like. The institution system 305 may hold a deliverer account 317 for the deliverer 110 and a receiver account 327 for the receiver 120. The deliverer 110 and the receiver 120 may deposit funds in their associated account.

The deliverer 110 or the receiver 120 may access the institution system 305 by opening a communication pathway via the network 130 using their associated computing device. There may be several ways in which the communication pathway may be established, including, but not limited to, an Internet connection via a website 318 of the institution system 305. The deliverer 110 or the receiver 120 may access the website 318 and log into the website 318 using credentials, such as, but not limited to, a username and a password.

The institution system 305 may include a user interface module 320. The user interface module 320 may generate and format one or more pages of content 319 as a unified graphical presentation that may be provided to the deliverer computing device 112 or the receiver computing device 122. In an implementation, the page(s) of content 319 may be provided to the deliverer computing device 112 or the receiver computing device 122 via a secure website such as the website 318.

The institution system 305 may act as an intermediary to facilitate payment for the items and pick up and delivery fees from the receiver 120 and payment of pick up and delivery fees (and in some cases, item purchase prices) to the deliverer 110. The institution system 305 may maintain the deliverer account 317 and the receiver account 327 to facilitate the payments and transfers of funds.

In an implementation, the institution system 305 may host or maintain a website that contains the listings that may be posted and/or viewed by the deliverer 110 or the receiver 120, as described further herein.

For example, the institution system 305 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may maintain a website and provide access to accounts held by the institution system 305.

The institution system 305 has access to data, files, and documents pertaining to the receiver 120 and/or the deliverer 110 as well as any other data, files, and documents that are internal or external to the institution system 305 that may be useful in posting a listing for an item, revising a listing, and/or facilitating a transaction between the receiver 120 and the deliverer 110, for example.

The institution system 305 has the ability to retrieve information from one or more data sources 329. Data pertaining to the deliverer 110, the deliverer account 317, the receiver 120, and/or the receiver account 327 may be retrieved from data source(s) 329 and/or external data sources. The retrieved data may be stored centrally. Other information may be provided to the institution system 305 from the receiver 120 and/or the deliverer 110.

Data source(s) 329 may contain data, metadata, email, files, and/or documents that the institution system 305 maintains pertaining to the receiver 120 and/or the deliverer 110, such as personal data such as name, physical address, email address, etc. and financial data such as credit card numbers and checking account numbers. Such data may be useful for posting a listing for an item, revising a listing, and/or facilitating a transaction as described herein. Additionally or alternatively, the institution system 305 may access this information when moving funds into or out from an account.

Each computing device (e.g., the deliverer computing device 112, the receiver computing device 122, etc.) may provide user access to a system which is coupled to the institution system 305 and is configured to receive a plurality of user requests, at least one of which is a request to post, view, or reply to item listings or to view transaction status. A system may be configured to format and transmit a graphical user interface to a user, and through the graphical user interface provide the user with the ability to interact with and manipulate the data provided by the institution system 305.

A user access system may be implemented as a web server in an implementation. The user access system, through the use of any suitable interactive web technology, provides an interactive experience to the receiver 120 and/or the deliverer 110 through which access to listing and transaction data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 305 may comprise one or more computing devices 306. The computing device(s) 306 may have one or more processors, storage (e.g., storage devices, memory, etc.), and software modules. The computing device(s) 306 may be used in the performance of the techniques and operations described herein.

Examples of software modules may include modules that may be used in conjunction with receiving, posting, and revising a listing, maintaining listings of items, processing a transaction, generating web page content for display, and receiving instructions from the deliverer 110 or the receiver 120, for example. While specific functionality is described herein as occurring with respect to specific modules, the functionality may likewise be performed by more, fewer, or other modules. An example computing device and its components are described in more detail with respect to FIG. 7.

Figure 4:
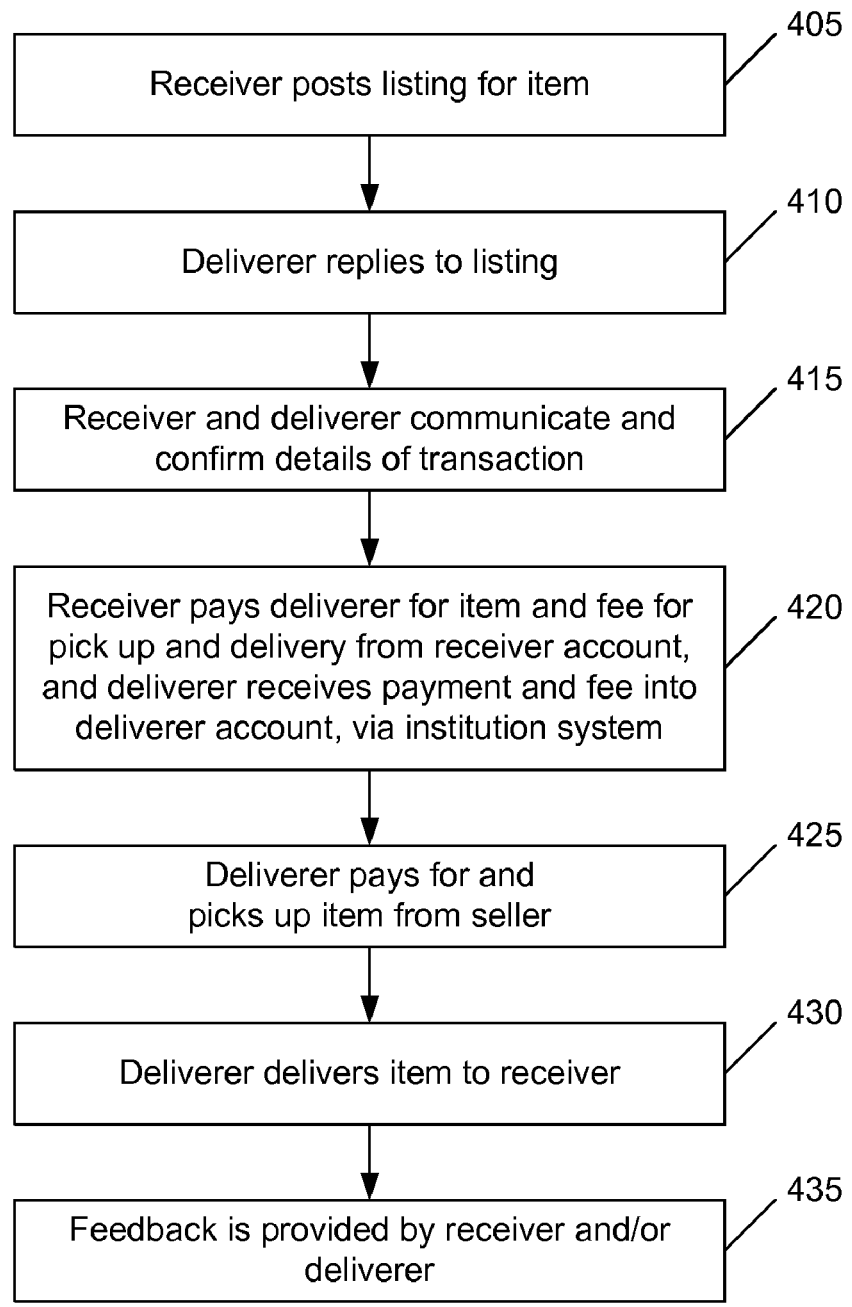
FIG. 4 is an operational flow of another implementation of a method that may be used with a social network for shopping.

FIG. 4 is an operational flow of another implementation of a method 400 that may be used with a social network for shopping. An institution system associated with a financial institution may act as an intermediary to facilitate payment for an item and payment of a fee to the deliverer for pick up and delivery of the item to the receiver. The institution system may maintain a deliverer account and a receiver account to facilitate the payments and transfers of funds.

At 405, a user, such as the receiver, may post a listing for an item. Similar to 205 of FIG. 2, the listing may be posted on a website associated with a social network for shopping, or may be sent to one or more users by email, text message, instant message, RSS feed, etc. In addition to other information such as that described with respect to 205 for example, the listing may indicate that payment for the item and/or payment of a pick up and delivery fee may be made from an account associated with an institution system and/or to an account associated with the institution system.

At 410, similar to 210, another user, such as the deliverer, may view the listing and reply to the listing. At 415, similar to 215, the receiver and the deliverer may be put into communication with each other and may confirm details of the transaction. In addition to those details described with respect to 215 for example, the receiver and the deliverer may agree to have a funds transfer between the receiver and the deliverer be performed by the institution system. This may provide additional security to the receiver and the deliverer to ensure their compliance with the details of the transaction.

At 420, the receiver may pay the deliverer for the item and the pick up and delivery fee from an account of the receiver held by the institution system. In this manner, the institution system may ensure that the receiver has sufficient funds to pay for the item and fee. In an implementation, the receiver may pay the deliverer for the item by transferring funds from the receiver account to a deliverer account held by the institution system. The institution system may facilitate the transfer of funds by acting as an intermediary between the receiver and the deliverer. Thus, the receiver may not have direct access to the account of the deliverer, and vice versa.

The transfer of funds relating to the purchase price of the item and the pick up and delivery fee may be made either before or after the deliverer has picked up and/or delivered the item. The transfer of funds relating to the purchase price of the item may be made separately from, or together with, the transfer of funds relating to the pick up and delivery fee. In an alternative implementation, the institution system may pay funds from the receiver account to the deliverer via check or any other payment method in which funds are withdrawn from the receiver account.

At 425, the deliverer may go to the seller of the item, pay for the item, and pick up the item. At 430, similar to 230, the deliverer may deliver the item to the receiver or a party specified by the receiver at an agreed upon location. At 435, similar to 240, feedback concerning the transaction may be provided by the receiver and/or the deliverer.

Figure 5:
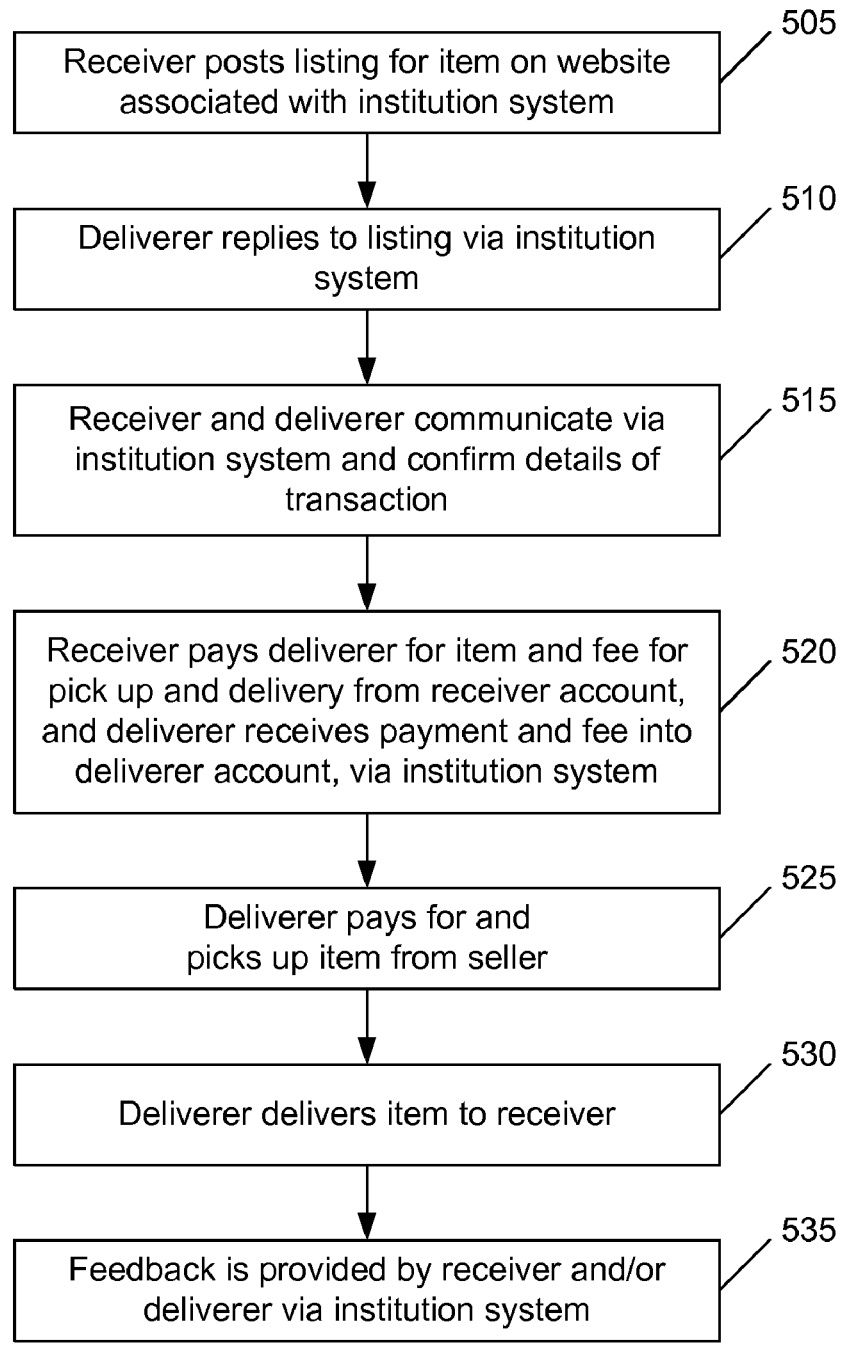
FIG. 5 is an operational flow of another implementation of a method that may be used with a social network for shopping.

FIG. 5 is an operational flow of another implementation of a method 500 that may be used with a social network for shopping. In addition to acting as an intermediary between the deliverer and the receiver as described with respect to the method 400 of FIG. 4, the institution system may host a website for a social network for shopping. This may allow the institution system to provide additional security to the transaction.

At 505, a user, such as the receiver, may post a listing for an item on a website associated with and/or maintained by the institution system. Alternatively or additionally, the receiver may send the listing to one or more users by email, text message, instant message, RSS feed, etc. via the institution system. As with 405 of FIG. 4, for example, the listing may indicate that payment for the item and/or payment of a pick up and delivery fee may be made from an account associated with an institution system and/or to an account associated with the institution system.

At 510, another user, such as the deliverer, may view the listing and reply to the listing. The user may reply to the listing via the institution system, such as via a website associated with and/or maintained by the institution system. The institution system may provide the reply to the receiver. Alternatively, the user may reply to the listing outside of the institution system, similar to 210 of FIG. 2 for example.

At 515, the receiver and the deliverer may be put into communication with each other via the institution system and may confirm details of the transaction. Thus, the institution system may receive a listing from the receiver and forward it to users who may include a potential deliverer, and the institution system may receive a reply from the deliverer and forward it to the receiver. In an implementation, subsequent communications between the receiver and the deliverer may take place through the institution system. In this manner, the receiver and deliverer may not be in direct contact with each other, and instead may communicate through the institution system which may act as an intermediary between the receiver and the deliverer. This provides a layer of security to the receiver and the deliverer.

Operations 520, 525, and 530 may be similar to 420, 425, and 430 described with respect to the method 400 of FIG. 4. At 520, the receiver may pay the deliverer for the item and the pick up and delivery fee from an account of the receiver held by the institution system. The institution system may ensure that the receiver has sufficient funds and may facilitate the transfer of funds by acting as an intermediary between the receiver and the deliverer. At 525, the deliverer may go to the seller of the item, pay for the item, and pick up the item. At 530, the deliverer may deliver the item to the receiver or a party specified by the receiver at an agreed upon location.

At 535, feedback concerning the transaction may be provided by the receiver and/or the deliverer. The feedback may be requested, collected, processed, analyzed, and maintained by the institution system. The feedback may be made available to users of the social network for shopping. In an implementation, the feedback may be used to generate ratings and/or rankings for the users of the social network for shopping including the receiver and the deliverer.

Figure 6:
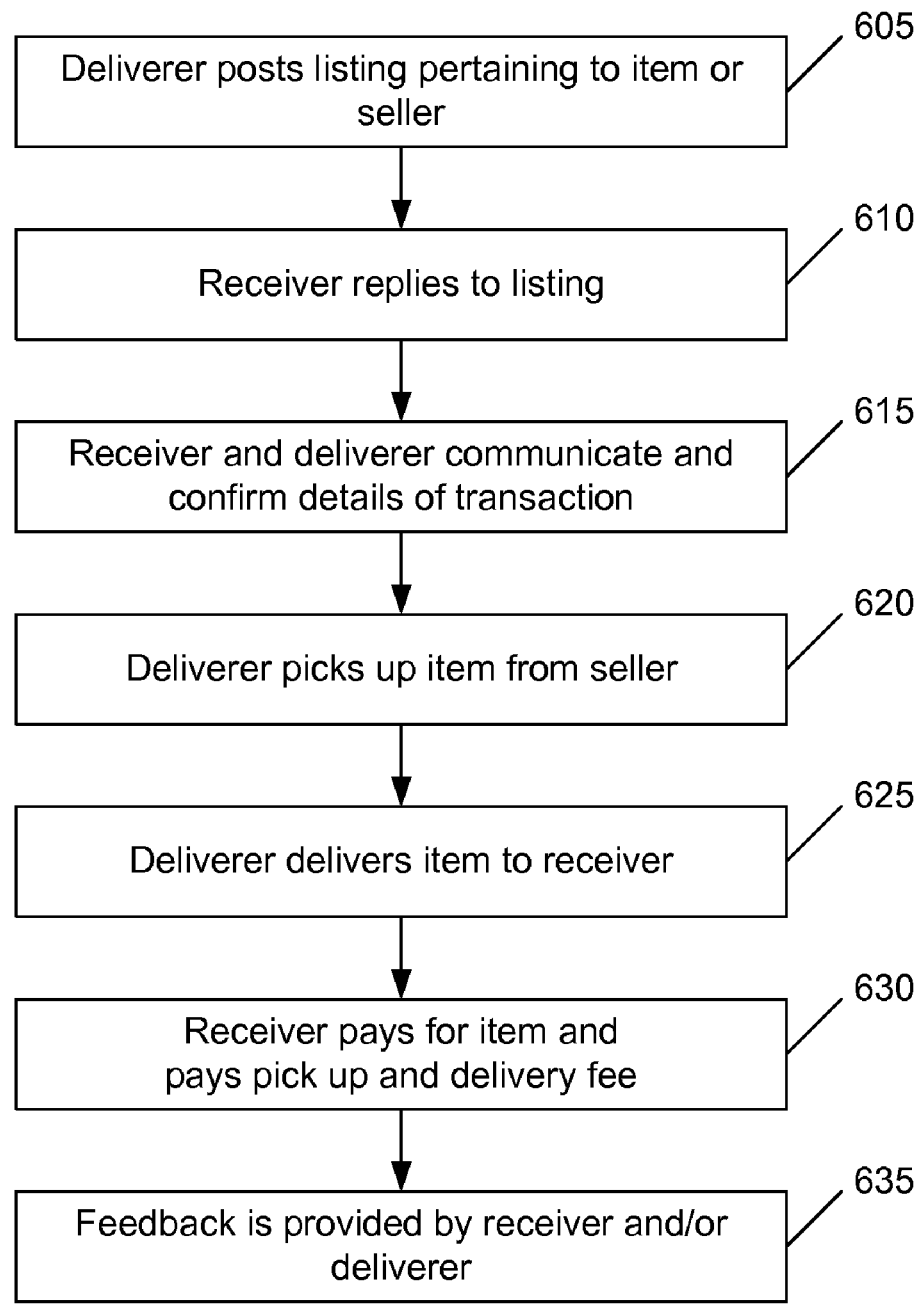
FIG. 6 is an operational flow of another implementation of a method that may be used with a social network for shopping.

FIG. 6 is an operational flow of another implementation of a method 600 that may be used with a social network for shopping. Instead of the receiver posting a listing for an item they would like picked up and delivered, the deliverer may post a listing to determine if any users of the social network for shopping would like an item picked up and delivered. An institution system may host a website for a social network for shopping and/or may maintain a deliverer account and a receiver account to facilitate the payments and transfers of funds, thereby acting as an intermediary between the deliverer and the receiver.

At 605, a user, such as the deliverer, may post a listing for an item they are going to buy or may post a listing identifying a seller (e.g., supermarket, hardware store, etc.) or location (e.g., San Francisco, London, etc.) they are traveling to or already present at. The listing may offer to pick up and deliver the item to a user (a receiver) or may offer to pick up and deliver an item that may be sold by the seller or sold or otherwise available at the location. The listing may be posted on a website associated with a social network for shopping, for example. Alternatively or additionally, the listing may be sent to one or more users by email, text message, instant message, RSS feed, etc. For example, the deliverer may post or send a listing from a handheld computing device when the deliverer is at a particular seller or location.

The deliverer may provide (e.g., in the listing) location criteria such as where they will deliver an item, price criteria such as how much they will spend on an item or how much they will spend for the receiver without the receiver prepaying for an item, time criteria such as when the deliverer may deliver the item to the receiver, and geographic criteria such as how far the deliverer will travel to pick up an item. The deliverer may indicate a pick up and delivery fee that the receiver may pay, and may indicate product criteria and/or restrictions. For example, the deliverer may indicate that they will not purchase, pick up, or deliver certain types of items, such as perishable items, large or bulky items, or items that may be subject to purchase and/or distribution restrictions.

At 610, one or more other users, each being a potential receiver, may view the listing and reply to the listing. The receiver may indicate an item they would like the deliverer to pick up and deliver. The receiver may provide certain criteria that may be met prior to the deliverer purchasing an item, such as price criteria, location criteria, and/or time criteria, for example. For example, the receiver may only want the item if the deliverer can purchase the item for a certain price (e.g., less than a certain price, no higher than a certain price, etc.). As another example, the receiver may only want the item if the deliverer can deliver the item to a certain location within a certain time frame.

In an implementation, the receiver may send a picture, such as a digital image, to the deliverer of the item that the receiver would like the deliverer to pick up and deliver. Alternatively or additionally, the deliverer may send a picture to the receiver of an item prior to picking up the item. For example, the receiver or the deliverer may capture a picture of an item using a camera phone (e.g., a mobile phone having a camera) and transmit the picture using the camera phone. This may help to ensure that the deliverer picks up the correct item for delivery to the receiver.

At 615, similar to 215 of FIG. 2, the receiver and deliverer may be put into communication with each other and confirm details of the transaction. At 620, the deliverer may go to the seller of the item and pick up the item. As described with respect to 225 of FIG. 2, if the receiver had previously paid the seller for the item, the deliverer may provide identification or other information to the seller regarding the purchase and/or authorization to pick up the item on the receiver's behalf. If the receiver had not previously paid the seller for the item, the deliverer may pay the seller for the item. At 625, the deliverer may deliver the item to the receiver at an agreed upon location. In an implementation, if the deliverer is picking up items for multiple receivers, the deliverer may set a central pick up location for all the receivers to come to for the item delivery.

At 630, the receiver may pay for the item and may pay a pick up and delivery fee. In an implementation, as described with respect to the method 200 of FIG. 2, the receiver may pay the seller for the item prior to the pick up and delivery of the item, such as via a website associated with the seller, via telephone or facsimile, via mail, or via email, for example. Alternatively, the receiver may pay the deliverer for the item, either before or after the deliverer has picked up and/or delivered the item. In such a case, the deliverer may pay the seller for the item, e.g. when picking up the item from the seller. The receiver may pay the deliverer using any known payment method.

At 635, similar to 240 for example, feedback concerning the transaction may be provided by the receiver and/or the deliverer. The feedback may be used for rating and/or ranking of the receiver and the deliverer and may be available to the receiver, the deliverer, and other users of the social network for shopping.

It will be appreciated that the examples herein are for purposes of illustration and explanation only, and that an embodiment is not limited to such examples.

Exemplary Computing Arrangement

Figure 7:
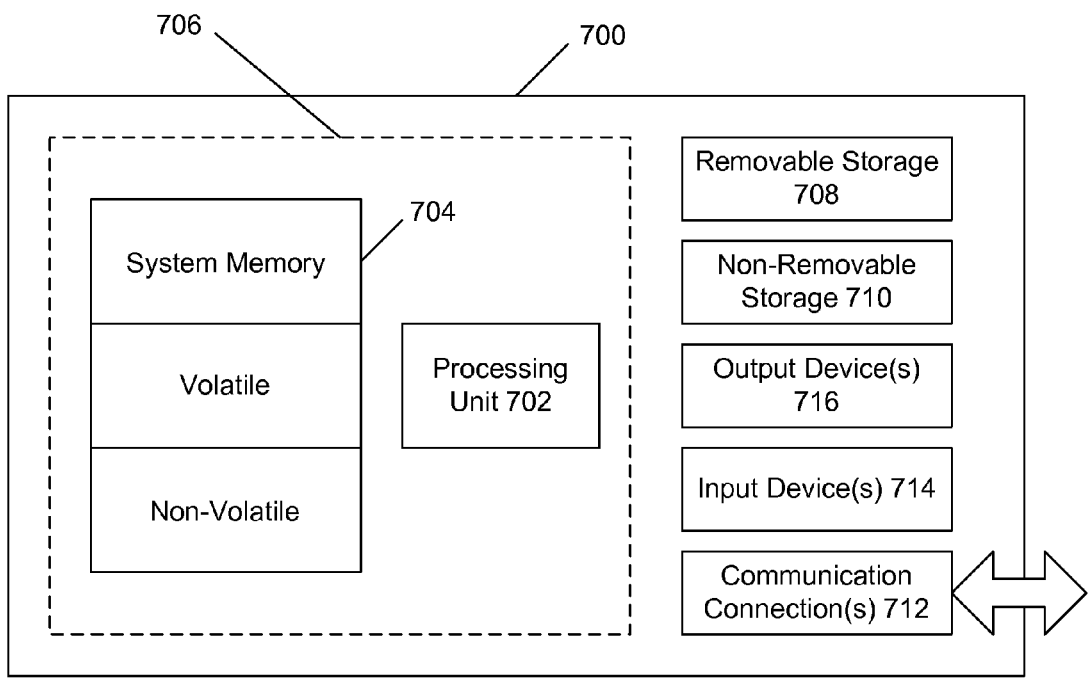
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and system memory 704. Depending on the exact configuration and type of computing device, system memory 704 may be volatile (such as RAM), non-volatile (such as read-only memory (ROM), flash memory, etc.), or some combination of the two. This most basic configuration is illustrated in FIG. 7 by dashed line 706.

Computing device 700 may have additional features and/or functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer-readable media. Computer-readable media can be any available media that can be accessed by computing device 700 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 704, removable storage 708, and non-removable storage 710 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may also contain communication connection(s) 712 that allow the computing device 700 to communicate with other devices. Communication connection(s) 712 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A shopping method, comprising:
   electronically posting via a server associated with a computer-implemented social network for shopping a listing for a receiver for first item available from a seller, the listing requesting a pick up of the first item from the seller and a delivery of the first item to the receiver;
   electronically receiving at the computer-implemented social network for shopping a reply to the listing from a deliverer who agrees to the pick up of the first item from the seller and the delivery of the first item to the receiver;
   electronically providing an identity of the seller to the computer-implemented social network, wherein the identity of the seller is provided to the computer-implemented social network by the deliverer to provide a user of the computer-implemented social network to request a pick up of a second item for delivery to the user by the deliverer;
   electronically providing an indication on the listing that a transaction for the item first is in progress after the reply from the deliverer is received;
   electronically providing a communication pathway to an institution system capable of maintaining accounts and providing funds to and from accounts wherein the institution system may hold a deliverer account and a receiver account, and wherein the institution system may electronically post via a server the listing posted and viewed by the deliverer or the receiver;
   electronically removing the listing and providing authentication and confirmation techniques to the seller, receiver, and deliverer after the transaction for the first item is complete;

electronically receiving at a computing device of the social network for shopping feedback regarding the deliverer from at least one of the seller or the receiver; and electronically generating a rating for the deliverer using the feedback at the computing device of the social network for shopping.

2. The method of claim 1, wherein posting the listing for the first item comprises posting the listing on a website associated with the social network for shopping.

3. The method of claim 1, wherein posting the listing for the first item comprises sending the listing to a plurality of users via a web feed, an email, a text message, or an instant message, the deliverer being one of the plurality of users.

4. The method of claim 1, further comprising paying the seller for the first item.

5. The method of claim 1, further comprising paying the deliverer for the first item.

6. The method of claim 1, further comprising paying a fee to the deliverer for the pick up of the first item from the seller and the delivery of the first item.

7. The method of claim 1 wherein the institution system facilitates the transfer of funds between the receiver and the deliverer.

8. A non-transitory computer-readable medium comprising computer-readable instructions for shopping, said computer-readable instructions comprising instructions that:

electronically post via a server associated with a computer-implemented social network for shopping a listing for a receiver for a first item available from a seller, the listing requesting a pick up of the first item from the seller and a delivery of the first item to the receiver;

electronically receive at the computer-implemented social network for shopping a reply to the listing from a deliverer who agrees to the pick up of the first item from the seller and the delivery of the first item to the receiver;

electronically provide an identity of the seller to the computer-implemented social network, wherein the identity of the seller is provided to the computer-implemented social network by the deliverer to provide a user of the computer-implemented social network to request a pick up of a second item for delivery to the user by the deliverer;

electronically provide an indication on the listing that a transaction for the first item is in progress after the reply from the deliverer is received;

electronically provide a communication pathway to an institution system capable of maintaining accounts and providing funds to and from accounts wherein the institution system may hold a deliverer account and a receiver account, and wherein the institution system may electronically, post via a server the listing posted and viewed by the deliverer or the receiver;

electronically remove the listing and provide authentication and confirmation techniques to the seller, receiver, and deliverer after the transaction for the first item is complete;

electronically receive at a computing device of the social network for shopping feedback regarding the deliverer from at least one of the seller or the receiver; and electronically generate a rating for the deliverer using the feedback at the computing device of the social network for shopping.

9. The non-transitory computer-readable medium of claim 8, wherein the instructions that post the listing for the first item comprise instructions that post the listing on a website associated with the social network for shopping.

10. The non-transitory computer-readable medium of claim 8, wherein the instructions that post the listing for the first item comprise instructions that send the listing to a plurality of users via a web feed, an email, a text message, or an instant message, the deliverer being one of the plurality of users.

11. The non-transitory computer-readable medium of claim 8, further comprising instructions that pay the seller for the first item.

12. The non-transitory computer-readable medium of claim 8, further comprising instructions that pay the deliverer for the first item.

13. The non-transitory computer-readable medium of claim 8, further comprising instructions that pay a fee to the deliverer for the pick up of the first item from the seller and the delivery of the first item.

14. The non-transitory computer-readable medium of claim 8 wherein the institution system facilitates the transfer of funds between the receiver and the deliverer.

15. A shopping system, comprising:

one or more computer devices;

at least one subsystem of the one or more computer devices that electronically posts via a server associated with a computer-implemented social network for shopping a listing for a receiver for a first item available from a seller, the listing requesting a pick up of the first item from the seller and a delivery of the first item to the receiver;

at least one subsystem of the one or more computer devices that electronically receives at the computer-implemented social network for shopping a reply to the listing from a deliverer who agrees to the pick up of the first item from the seller and the delivery of the first item to the receiver;

at least one subsystem of the one or more computer devices that electronically provides an identity of the seller to the computer-implemented social network, wherein the identity of the seller is provided to the subsystem by the deliverer to provide a user of the computer-implemented social network to request a pick up of a second item for delivery to the user by the deliverer;

at least one subsystem of the one or more computer devices that electronically provides an indication on the listing that a transaction for the first item is in progress after the reply from the deliverer is received;

at least one subsystem of the one or more computer devices that electronically provides a communication pathway to an institution system capable of maintaining accounts and providing funds to and from accounts wherein the institution system may hold a deliverer account and a receiver account, and wherein the institution system may electronically post via a server the listing posted and viewed by the deliverer or the receiver;

at least one subsystem of the one or more computer devices that electronically removes the listing and provides authentication and confirmation techniques to the seller, receiver, and deliverer after the transaction for the first item is complete;

at least one subsystem of the one or more computer devices that electronically receives at a computing device of the social network for shopping feedback regarding the deliverer from at least one of the seller or the receiver; and at least one subsystem of the one or more computer devices that electronically generates a rating for the deliverer using the feedback at the computing device of the social network for shopping.

16. The system of claim 15, wherein the at least one subsystem of the one or more computer devices that posts the listing for the first item comprises at least one subsystem that posts the listing on a website associated with the social network for shopping.

17. The system of claim 15, wherein the at least one subsystem of the one or more computer devices that posts the listing for the first item comprises at least one subsystem that sends the listing to a plurality of users via a web feed, an email, a text message, or an instant message, the deliverer being one of the plurality of users.

18. The system of claim 15, further comprising at least one subsystem of the one or more computer devices that pays the seller for the first item.

19. The system of claim 15, further comprising at least one subsystem of the one or more computer devices that pays the deliverer for the first item.

20. The system of claim 15, further comprising at least one subsystem of the one or more computer devices that pays a fee to the deliverer for the pick up of the first item from the seller and the delivery of the first item.

21. The system of claim 15 wherein the institution system facilitates the transfer of funds between the receiver and the deliverer.

* * * * *